United States Patent
Savolainen

(10) Patent No.: US 6,797,810 B1
(45) Date of Patent: Sep. 28, 2004

(54) METHOD FOR ISOLATION AND MODIFICATION OF PROTEINS

(76) Inventor: Jouko Savolainen, Kuuńnnllyntle 26, 02700 Kauunjainen (FI)

( * ) Notice: Subject to any disclaimer, the term of this patent is extended or adjusted under 35 U.S.C. 154(b) by 0 days.

(21) Appl. No.: 09/674,034

(22) PCT Filed: Apr. 28, 1999

(86) PCT No.: PCT/FI99/00347

§ 371 (c)(1), (2), (4) Date: Jan. 3, 2001

(87) PCT Pub. No.: WO99/55170

PCT Pub. Date: Nov. 4, 1999

(30) Foreign Application Priority Data

Apr. 29, 1998 (FI) .................................. 980945

(51) Int. Cl.$^7$ ............................ C07K 1/00; A23J 1/20; A23C 21/00
(52) U.S. Cl. ..................... 530/366; 530/360; 530/370; 530/418; 426/41; 426/583; 424/535; 514/2
(58) Field of Search ................... 426/41, 583; 424/535; 530/360, 366, 370, 418; 514/2

(56) References Cited

FOREIGN PATENT DOCUMENTS

| FI | 96266 | 8/1995 |
| FI | 101514 | 8/1995 |
| WO | WO 9522907 | 8/1995 |
| WO | WO 95/22907 | * 8/1995 |

OTHER PUBLICATIONS

Petruccelli etal., J. Agric. Food Chem., vol. 43, pp. 2001–2006, 1995.*
Silvana Petrucelli et al., "Partial Reduction of Soy Protein Isolate Disulfide Bonds", J. Agric. Food Chem., vol. 43, 1995, pp. 2001–2006.
Navin K. D. Kella et al., "Effect of Disulfide Bond Cleavage on Structural and Interfacial Properties of Whey Proteins", Journal of Agricultural and Food Chemistry, vol. 37, No. 5, 1989, pp. 1203–1210.
Juan Gonzalez et al., "Recovery of Protein From Raw Sweet Whey Using a Solid State Sulfitolysis", Journal of Food Science, vol. 55, No. 6, 1990, pp. 2–6.

* cited by examiner

*Primary Examiner*—Christopher S. F. Low
*Assistant Examiner*—Abdel A. Mohamed
(74) *Attorney, Agent, or Firm*—Hogan & Hartson, LLP

(57) ABSTRACT

A method for modification and isolation of a protein is provided. The method includes the steps of providing a protein selected from the group consisting of whey and soy proteins; providing a reagent that forms sulfite ions; mixing the protein with the reagent under a condition to sulfonate the protein without using an oxidizing agent and to obtain a mixture containing a sulfonated protein; precipitating the sulfonated protein out of the mixture at an acid pH to form a precipitated sulfonated protein and a soluble sulfonated protein; and recovering the precipitated sulfonated protein or soluble sulfonated protein.

16 Claims, No Drawings

METHOD FOR ISOLATION AND MODIFICATION OF PROTEINS

BACKGROUND OF THE INVENTION

1. Field of the Invention

The invention concerns a method for isolation of proteins, especially from whey or soya, and for modification of the isolated proteins by bringing the proteins especially whey or soy or a concentrate thereof in contact with a reagent that forms sulfite ions in order to sulfonate the protein.

2. Description of the Related Art

Whey proteins are when compared to other proteins superior in their nutritional value especially for their lysine and methionine content. Processing whey proteins for human consumption and functional food products would augment the processing value of whey and thus increase the profitability of cheese production. Although whey proteins possess good opportunities for use as raw material for food stuffs, the biggest obstacles for their use are expensiveness of recovery and fraction isolation processes as well as varying and poor functional properties of protein concentrates and isolates such as poor solubility, emulsifying, gelling and foaming properties.

The isolation of whey proteins is complicated by their good solubility, which cannot be affected by change of pH at pH values 2–9 whilst the proteins are in their native form. Proteins may be isolated according to four principal methods; 1. denaturation by heat and precipitation, 2. ultrafiltration, 3. ion exchange, and 4. chemical modification and precipitation.

The best known method for isolation of whey proteins is denaturation by heat along with decrease of pH to acidic. This method accomplishes a protein that has lost almost all its main functional properties. This protein is used mainly in various spreads, e.g. processed cheese, as partial or total substitute for cheese [Hill et al., Can. Int. FoodSci. Technol. J 15(1982) 155–160].

Nowadays whey proteins are isolated mainly as protein concentrate by using ultrafiltration and drying or as protein isolate by using ion exchange adsorption techniques and drying. Both methods allow for isolation of functional proteins. The decisive factor when choosing between these production methods is functionality of the recovered product and its production costs.

However, there is great variation in composition, functionality and sensory properties amongst protein concentrates produced by methods described above which is why industry shuns from their use. The variation is due to varying compositions of the whey used and differences in pretreatment and production and handling conditions.

Even in protein isolates there are variations of various properties due to the factors described above. The ion exchange adsorption method used in their production evens out the variation somewhat, and gives eventually a product that differs in composition from the protein concentrate obtained by ultrafiltration. It has been noted that the isolates have clearly better quality and functional properties than the concentrates in terms of the protein and fat content as well as the protein's solubility, foaming expansion and stability, absence of protein denaturation and aggregation as well as flavor. The relatively high lactose and mineral content as well as poor flavor of the concentrates are factors that limit their use by the food industry. The utility of whey protein isolates is in spite of their good properties limited by high product cost due to the method of production.

It is also well known that by changing the protein structure by chemical reaction one can affect the molecule's spatial structure/conformation, charge and hydrophobicity and thus even some other properties of the protein such as its solubility, viscosity, foaming and emulsification.

The most practical and simple chemical method for modifying the structure of the protein molecule is sulfonation, more particularly thiosulfonation, i.e. S-sulfonation that is accomplished by oxidative sulfitolysis. Thereby the sulfur bridges i.e. disulfide bonds between the protein's amino acid chains are cleaved which is accomplished by addition of sulfite ions that in turn initiates an oxidation-reduction reaction in which one sulfur is oxidized into sulfonate and the other is reduced to a sulfhydryl group.

By adding yet an oxidative factor the free sulfhydryl groups are reoxidized to 30 disulfide bonds which in turn continue in the reaction until all sulfhydryl groups have sulfonated or some other reaction factor becomes limiting. The principle of oxidative sultitolysis is described by the following equations:

2RS—SR+2HSO$_3^-$< - - - >2RS—SO$_3^-$+2RSH

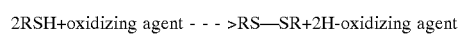
2RSH+oxidizing agent - - - >RS—SR+2H-oxidizing agent

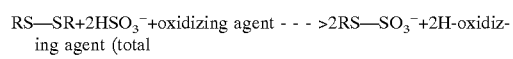
RS—SR+2HSO$_3^-$+oxidizing agent - - - >2RS—SO$_3^-$+2H-oxidizing agent (total Here RS—SR stands for a protein molecule that consists of two amino acid chains R such that S—S is the disulfide bond between the two amino acid chains. It connects the amino acid chains and contributes to holding them locked in a certain position. The modified protein molecules may be precipitated out of the solution by lowering the pH from the sulfitolysis reaction pH to pH 3–5.

According to publication Kella, N .K. D., et al., J. Agr. Food Chem. 37 (1989) 1203–1210, oxidative sulfitolysis is used for modification whey protein isolate molecules in order to affect the functional properties of the proteins such as solubility, viscosity, foaming expansion and stability. The property affecting factor was reduction of the number of disulfide bonds compared to the original number of the same. Certain properties were either improved or worsened along with the sinking amount of disulfide bonds. Amongst others, solubility lowered under 5% already by cleavage of 25% of the disulfide bonds whilst also the minimum solubility of the solubility of pH curve changed:

In the modification reaction the concentrations were protein isolates 1.0%, sulfite 0.1 M, urea 4 M and the pH 7.0 and temperature 25° C. As oxidizing agent was used oxygen blown through the solution and as catalyst CUSO$_4$ solubilized to a concentration of 800 mM. Protein isolates modified to varying degrees were isolated by precipitation with ammoniumsulfate which was added to the solution in such an amount that it formed a to 50% saturated solution. The changed solubility properties were not taken advantage of in protein isolation.

In the publication Gonzales, J. M., Damodaran, S., *J Food Sci.* 55:6 (1990) 1559–1,563, oxidative sulfitolysis was used in order to isolate proteins in sweet raw whey in which the protein concentration was about 0.6% in almost similar experimental conditions as above; pH 7.0, sulfite concentration 0.1 M, temperature 25° C., oxygen as oxidizing agent and $Cu^{2+}$ ion of $CuCO_3$ as catalyst, in this case, however, as solid beads packed in a glass column. The product of sulfitolysis was oxidized to a sulfonate derivative by recycling it in the column packed with the aforementioned 35 beads. Then the remnants of the beads were removed from the liquid reaction mixture by centrifugation. The authors showed that in the conditions above, by mere sulfitolysis, i.e. by adding 0.1 M sulfite, only about 0.4 moles of the disulfide and sulfhydryl groups in relation to 43,000 g mol protein were sulfonated in 30 minutes and even this was thought to be due to the natural redox potential of whey. When oxidizing with oxygen using a catalyst in corresponding conditions about 1.5 moles of the disulfide and sulfhydryl groups were sulfonated in 3 minutes and about 2.3 moles in 30 minutes. The sulfonated and with copper chelated proteins were isolated as functional proteins by precipitation at pH 4.5. However, before precipitation from the solution the copper chelated in sulfonated whey protein had to be removed with EDTA treatment.

The above method was a complicated laboratory scale operation with non-concentrated whey protein. Here the reaction accelerating potential of increased temperature could not be taken advantage of because the solubility of oxygen and thus its concentration in the solution decrease such that this becomes the reaction limiting factor. Furthermore, the presence of plentiful electrolytes further limits the solubility of oxygen and thus also the oxygen concentration.

Oxidative sulfitolysis [Kella, N. K. D., et al., *J Agr. Food Chem.* 37 (1989) 1203–1210] has been used in order to fractionate soy proteins, e.g. glycinin, into smaller subunits. Glycinin is composed of several subunits which in turn are formed by two polypeptides. The polypeptides are attached to one another by one disulfide bond so 20 that by cleavage disulfide bonds by oxidative sulfitolysis the protein may be divided into smaller parts which in turn affects the functional properties, such as emulsifying, gelling and foaming properties, as shown by Petracelli, S., and Anon, M. C., *J. Agric. Food Chem.* 43 (1995) 2001–2006.

Sulfitolysis has even been used for modification of structure and conformation of a biologically active soy protein, the trypsin inhibitor, in order to destroy the activity of this protein that is detrimental to the digestive processes of humans. The trypsin inhibitor may be inactivated through heating although heating for one hour at 75° C. or heating for 10 min. at 100° C.inactivates only about 80% of the inhibitor.

Continued heating decreases the nutritional value of the protein. Heating 700 g soy flour for one hour in 2.1 liters 0.5 M Tris buffer, pH 8.5, with 4.78 g $Na_2SO_3$ (0.03 moles) fully destroyed trypsin inhibitor activity. Residual sulfite was removed by dialysis that took 3 days. As an alternative for sulfite removal was recommended precipitation of proteins at isoelectric point at pH 4.5, which method is used for precipitation of soy isolate in industrial manufacturing. In this procedure advantage is taken of washing away the sulfite liberated in the reaction represented further down in connection of protein isolation.

The modification of the structure/conformation of trypsin inhibitor was explained to be based on the cleavage of the disulfide group caused by sulfite according to the following equation:

After this, the S-sulfonate formed will react with another sulfhydryl group that is already there or is formed in the same sulfitolysis, forming therewith a new disulfide group in another location of the molecule. Simultaneously, sulfite is released from the S-sulfonate group according to the following equation:

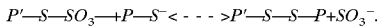

The total effect is creation of a new disulfide group and liberation of almost all of the sulfite [Friedman, M., and Gumbmann, M. R., *J Food Sci.* 51 (1986) 1239–1241]. The above applications which are based on oxidative sulfitolysis either did not strive to solve the problem posed by isolation but rather strived to modify certain properties of whey and soy proteins, or the solution gained is so difficult to apply in production scale that it was not feasible. The same applies to the use of sulfitolysis for inactivation of biologically active proteins or for modification of molecular structure of soy.

According to FI Patent 96 266, "Method for Isolation of Whey Proteins", and FI Patent Application 944 110, "Method and Device for Isolation of Whey Proteins", a method and process have been developed with the aim in mind to isolate and fractionate whey proteins as simply, functionally and economically as possible, producing as functional proteins as possible whose functional properties include e.g. emulsification, gelation and foaming. The products are of human consumption grade.

According to the above Finnish invention, whey proteins are concentrated 4–16 times before use such that their protein content is 2–7% weight/volume. Oxidative sulfitolysis is accomplished by adding sulfite to the whey protein concentrate in such an amount that the ratio of cleaved and sulfonated disulfide bonds to the original amount of disulfide bonds may be regulated.

Oxidation is performed after the sulfitolysis using a suitable chemical compound which is satisfactory for use with food stuffs and controllable, for example $CaO_2$, in order to avoid use of oxygen and a catalyst which is tedious and the limitations connected thereto. The reaction temperature is 30–55° C. and the reaction pH is 5.0–8.5.

The whey proteins once sulfonated can be precipitated by lowering the pH to 2.5–5.5. By lowering the pH to various pH levels one can precipitate out of the whey protein differently composed fractions that have main whey proteins, α-lactalbumin, BSA (bovine serum albumin) and β-lactoglobulin in various ratios.

The S-sulfone groups formed in oxidative sulfitolysis which are liberated during precipitation in acid environment as wet as the remaining sulfite are transformed into sulfur dioxide which is blown out with a suitable, sterile gas and recovered by neutralization for reuse.

The protein fraction precipitated is separated by microfiltration and then concentrated and washed by ultrafiltration. As a result, one gets a protein fraction concentrate that has certain protein, lactose and salt content. The proteins in soluble fraction are concentrated and washed by ultrafiltration in order to recover the desired protein fraction concentrate.

Although in the Finnish inventions described above the isolation of whey proteins as various fractions was simplified and the isolation was for the first time accomplished on a larger scale than before that was economically feasible, the isolation process as a whole still has many stages that prolong processing time and complicate handling producing thus costs.

BRIEF SUMMARY OF THE INVENTION

The object of the present invention is to simplify modification of proteins, especially whey and soy proteins and various other proteins by sulfonation and to speed up the fractionation procedure and further processing of fractions. This is accomplished as described in the attached claims.

The present inventor has realized that in modifying proteins such as whey or soy proteins the sulfitolysis as such creates sufficient cleavage of disulfide bonds thus rendering oxidization unneccessary in order to change conformation of the protein molecules and to precipitate them in acidic conditions. Omitting oxidation simplifies and speeds up the process rendering it economically more profitable. If sulfitolysis temperature for whey proteins is set at about 40–65° C., the reaction is accelerated along with reaction equilibrium moving towards the sulfonated products which reduces the amount of sulfite needed.

Even though in the following the invention is described by way of application to modification and isolation of whey proteins, the method according to invention is applicable even to processing other proteins such as soy proteins.

In the method according to the invention is used for economic reasons whey protein concentrate that has as high a protein content as possible. Most preferred is whey protein that has been concentrated in relation to the original whey some 16–20 times. Its protein content is 9–12 weight %.

According to invention, modification of whey or soy proteins, cleavage of disulfide bonds and modification of conformation are accomplished by sulfitolysis where the sulfite ion reacts specifically with one sulfur in the disulfide bond forming a S-sulfonate derivative. The other sulfur is reduced to a sulfhydryl group. The most useful sulfites are soluble and food-grade sodium sulfite, sodium hydrogensulfite and sodium metabisulfite even though also others may be used. In reaction conditions all of the above form mainly sodium sulfite and sodium hydrogensulfite. The functional and other properties of end products can be affected by sulfitolysis of the production process by defining the ratio of the amount of the sulfite to the amount of disulfide bonds present in the protein. In the sulfitolysis of whey proteins a suitable amount of sulfite is 0.02–0.20 M, preferred amount is 0.05–0.10 M.

From the point of view of precipitation based on pH, the whey or soy proteins sulfonated by sulfitolysis need not be oxidized which renders continuation of sulfonation in order to sulfonate all sulfhydryl groups liberated in sulfitolysis unneccessary. The oxidative sulfitolysis, i.e. sulfitolysis and oxidization, is a useful method when the situation and circumstances call for sulfonation of both sulfur atoms of the cleaved disulfide bonds.

In order to optimize the invented method one has to define also a suitable reaction temperature, suitable pH, pH values used in precipitations, the acids and bases used for changing pH, other reagents and suitable procedures and methods in order to obtain products with desired properties which may be protein concentrates or spray dried powders.

DETAILED DESCRIPTION OF THE INVENTION

According to one preferred embodiment of the invention the temperature of the sulfitolysis is 40–65° C. Sulfitolysis proceeds at pH 5.5–8.0, preferred is 6.0–7.0. Reaction time is 10–50 min, preferred is 20–40 min.

With the aforementioned factors one may influence functional properties of the modified proteins and fractions and with the pH value in precipitation the number of fractions and their composition as to the α-lactalbumin, BSA and β-lactogiobulin content.

In the method according to invention the proteins in the whey protein concentrate are first modified by sulfitolysis and then a certain part of the whey proteins are precipitated in acidic pH. The precipitation takes place at pH 1.5–5.5 while preferred is pH 4.0–5.0, and at a high enough temperature, preferably 40–65° C., most preferably 50–60° C.

The proteins modified by sulfitolysis can even be left unprecipitated, thus producing total whey proteins that are modified to various degrees and the protein composition of which is the same as that of the original whey concentrate but functional properties differ according to the degree of modification.

During precipitation or a separately conducted procedure with the pH clearly on the acidic side, pH 1.5–4.5, the sulfone groups formed in sulfitolysis and the sulfite remaining from the sulfitolysis are released as sulfur dioxide which is conveyed by blowing out with sterile gas, air or its mixture with nitrogen are preferred, to a receiving container where it is recovered as a mixture of sodium sulfite and sodium hydrogen sulfite and may be used in a later sulfitolysis. The sulfur dioxide released can thus be reused, a point which saves the raw material in question while the process does not burden the environment with sulfur dioxide emissions.

The pH of even those whey proteins that are left unfractionated is lowered to acid values at which the sulfone groups and remaining sulfite can be released as sulfur dioxide which is blown out as described above.

If desired, the precipitation may be followed by fractionation where the precipitate, i.e. the precipitated protein, is separated from soluble protein by a suitable method, preferred are microfiltration or centrifugation. When modified total protein is the goal, the separation is omitted.

If desired, the fractions are washed and concentrated by ultrafiltration at the pH of precipitation or near the same. It is preferred, that washing means diafiltration where purified water is added to the solution or suspension to be washed and the same is filtered away after mixing such that low molecular compounds such as salts and lactose are removed along with the filtrate. The procedure can be continued until the desired composition for the fraction at hand is reached as to the protein, lactose and salt content.

The degree of modification indicates the number of disulfide bonds cleaved. In acid conditions, at pH 1.5–4.5, the sulfone groups formed in sulfitolysis liberate such that from the cleaved disulfide group two sulfhydryl groups remain. The modified total protein concentrate or protein fraction concentrates or the dried powders obtained therefrom that are used in the end product may be of this type such that the liberated sulfhydryl groups can be made use of as functional properties in many ways better than before such as emulsification, gelation, foaming and hydrolyzability/digestibility.

Free sulfhydryl groups cause easily in suitable conditions cleavage of disulfide groups such that the sulfhydryl groups formed with other sulfhydryl groups present new disulfide groups, the result of which is the formation of protein nets that form in suspension around water drops an emulsifying protein membrane or in foam the same around an air bubble or a suitably powerful net for gel formation.

The sulfhydryl groups may be oxidized with an oxidizing agent, preferably air oxygen, dehydroascorbic acid or generally with food-grade oxidizing agents to disulfide bonds, preferably at pH 4.5–8.5, most preferred is pH 6.5–7.5, at a temperature of 45–75° C., most preferred is 50–70° C., by mixing the suspension or the solution vigorously such that disulfide bonds ate formed with not the same sulthydryl groups as in the original conformation of the protein. The end product, i.e. the modified protein or protein fraction concentrate or the corresponding powder has a higher pH than the previously described product, it has less free sulfhydryl groups and it has functional properties such as dispersability, emulsification, gelation and hydrolyzability/digestibility according to the degree of modification.

The sulfur dioxide liberated from the S-sulfone groups and sulfite that may not have been removed in blowing-out transforms along with pH increase to sulfite and oxidizes in the reactor to sulfate when blowing in oxygen and mixing vigorously at pH 4–7, preferably at pH 5–6, and at a temperature of 45–65° C., most preferably at 50–60° C., This is about oxidizing a small amount of sulfite, about 0.01% to sulfate. With sulfitolysis according the principles described above even other proteins such as soy proteins may be modified, e.g. soy isolates, concentrates and flours, even though their modification requires different conditions that are sufficient for the sulfitolysis to happen and thus for the disulfide bonds to cleave. For example, the modification of soy isolates may be conducted by sulfitolysis as follows: a 6–10% suspension of soy isolate is made in water. In sulfitolysis, the amount of sulfite used is 0.02–0.2 M, preferably 0.05–0.10 M. Reaction temperature is 60–80° C., preferably 65–75° C. Sulfitolysis is conducted at pH 5.5–8.0, preferably at pH 6.0–7.0. Reaction time is 10–50 min., preferably 20–40 min. After modification, the soy isolate may be isolated and washed at pH 4.5, which corresponds to the isoelectric point of soy proteins. Excess sulfite is removed along with wash water all the more efficiently the more times washing is performed; 2–3 times is sufficient. The sulfite may be recovered from wash waters by lowering the pH to 2 and blowing out the sulfur dioxide liberated to a receiving container as sulfite for further use. After this, having removed main body of the sulfite, the pH of the soy isolate modified is lowered to 2–3 such that the precipitate partly solubilizes and the S-sulfonate groups formed in sulfitolysis are liberated as sulfur dioxide in an environment this acidic. If need be, sulfur dioxide may be blown out at this stage. When the pH is again increased to 4.5 the small amount of sulfur dioxide formed is transformed into sodium hydrogen sulfite that can be washed away.

By soy isolate modification produced by sulfitolysis biologically active proteins, e.g. trypsin inhibitor can be inactivated along with improving the functional properties of the protein in question by increase of free sulfhydryl groups indicated by the degree of modification.

According to one embodiment of the invention the modification, fractionation, isolation and other treatment of whey proteins is accomplished in following stages: whey proteins are concentrated by ultrafiltration, the concentrate proteins are modified in structure/conformation by sulfitolysis, a part of proteins modified are precipitated by lowering the pH, sulfur dioxide formed at acid pH from sulfone groups and sulfite is blown out the reactor and recovered as sulfite for further sulfitolysis, the proteins precipitated are separated from soluble proteins by microfiltration, the proteins precipitated as well as the modified total protein is washed and concentrated by ultrafiltration at precipitation pH, or generally at an acid pH, the filtrate from microfiltration is washed and concentrated at precipitation pH or above the same, alternatively, the precipitated protein concentrate, modified total protein concentrate and soluble protein concentrate free sulfhydryl groups are oxidized to disulfide groups in a new order, plus washing and concentrating all protein concentrates by ultrafiltration and acquisition of end products as concentrates or dried powders.

Concentrating whey commences by microfiltration where casein particles that may be present are removed from whey, along with decreasing the amount of phospholipoproteins and bacteria. As a result of microfiltration, ultrafiltration is made easier. The microfiltration filtrate obtained is ultrafiltrated through 6,000–30,000 D membranes in order to increase protein concentration from the original 0.6% to 16–20 fold which corresponds to 9–12% protein content. A preferred protein content of the concentrate is 10–11%.

The whey protein structure is modified by sulfitolysis where the desired part of the disulfide bonds are cleaved and the degree of modification desired in relation to the original amount of disulfide bonds is acquired. In this embodiment, sulfitolysis of whey proteins is accomplished as follows:

The amount of whey protein concentrate needed, where protein content is e.g. 10%, is introduced to the reactor which is equipped with efficient mixing device plus temperature and pH control and adjustment. The concentrate is brought to a temperature of 40–65° C., preferably 50–60° C. The choice of temperature is determined amongst others by the reaction velocity desired, the chemicals used and the functional and other properties desired for the proteins isolated. To the protein concentrate at constant temperature is added sulfite either as $NaHSO_3$, $Na_2S_2O_5$ or as $Na_2SO_3$ to 0.02–0.2 M, for example 0.05–0.1 M, and the mixture is stirred vigorously. The amount of sulfite to be added is dependent amongst others on the protein concentration and the degree of sulfitolysis desired. pH is adjusted to 5.5–8, preferably 6–7, for example 6.5. In adjusting pH, food-grade acids and bases are used, e.g. HCl and NaOH. The time of treatment of proteins with sulfite is 10–50 min, preferably 20–40 min. The time is determined by the sum of factors mentioned above in order to reach the degree of modification desired.

After the modification desired has been accomplished, the proteins are precipitated by lowering the pH to 1.5–5.5, preferably to 4.0–5.0. The pH used in precipitation depends mainly on the protein composition desired for the fractions and somewhat on the degree of modification of the proteins.

The time used for precipitation is 10–40 min, for example 20–30 min. Proteins modified to a certain degree may be left unprecipitated if modified total protein is desired; here pH is lowered directly to a low enough value of pH 1.5–4.5 in order to release the sulfone groups and excess sulfite as sulfur dioxide, which is blown out with sterile air or mixture of air and nitrogen to a receiving container as a mixture of sodium sulfite and sodium hydrogen sulfite for further sulfitolysis.

The prepicipitated proteins are separated from the soluble ones by microfiltration. The fractions formed are handled separately. From the proteins fractionated, which amounts to the precipitated and the soluble fraction, sulfone groups and excess sulfite are liberated at an acidic pH as sulfur dioxide and blown out from the reaction mixture as described above.

The fractions gained are washed in order to decrease salt and lactose content and concentrated to the protein content and lactose and salt content desired at an acidic pH, for example at pH 4.5.

If desired, the pH of a fraction is increased to 5.5–7.5, for example pH 6.5, it is blown in sterile air such that the free sulfhydryl groups form disulfide bonds in locations of the protein molecule that differ from the original, this being due to mixing. The fraction at hand may be washed and concentrated before the pH raise or thereafter or at both stages.

The washed concentrates produced as described above are brought to the protein concentration required and they are ready for further applications. The concentrates may even be dried as powders which are used as such for further application.

By all the important parameters of sulfitolysis, i.e. the protein concentration of protein concentrate, the amount of sulfite, reaction temperature and reaction pH in various stages plus reaction times applied at various stages the implementation of various partial reactions of the isolation process can be influenced as may be the end result of the process as a whole, i.e. the amount of protein, their composition and the properties desired therefor in the fractions to be isolated.

The following examples illustrate the invention described above.

EXAMPLE 1

In order to produce whey protein concentrate fresh whey formed in the manufacture of Edam cheese was used. Its protein concentration was 0.6% which was obtained by multiplying the protein nitrogen determined by Kjeldahl method by the constant 6.38. The whey was first microfiltrated through 0.45 $\mu$m membrane filters using Millipore Pellicon laboratory equipment. The filtrate obtained by microfiltration was concentrated by filtering it using the same equipment through 10,000 D ultrafiltration membranes such that the protein content of concentrate varied form 8% to 12%.

For modification and fractionation 0.5 liters of whey concentrate the concentration of which was 8.5% weight/volume were transferred to a 1.0 liter glass beaker. The beaker was placed in a temperature adjustable water bath and the contents were stirred by means of an efficient mixer. The temperature of the concentrate was set at 45° C.

Sulfitolysis was initiated by adding to protein concentrate 2.4 grams $Na_2S_2O_5$ (sodium metabisulfite), and the pH was adjusted to 6.0 with NaOH. The mixture was stirred and the reaction allowed to proceed for 30 min. After this, the proteins modified were partly precipitated by lowering the pH to 4.8 by adding HCl to the mixture. The mixture comprising the precipitate was stirred for another 15 min. The precipitate was removed by centrifugation in a Sorvall RC-5B centrifuge at 10,000 rpm for 30 min. The proteins precipitated were well separated leaving the soluble portion clear. From the soluble portion, i.e. supernatant, protein concentration was determined. By subtracting the protein content of the supernatant from the protein concentration of the original protein concentrate could be calculated, while taking into account dilution during processing, the protein distribution in the precipitated and soluble portions in relation to total protein. In this case, the amount of precipitated protein was 21% and that of the soluble protein accordingly 79%.

EXAMPLE 2

For modification and fractionation 0.5 liters of whey protein concentrate that had been concentrated as described above by filtration and the concentration of which was 10.5% were transferred to a 1.0 liter glass beaker. The temperature of the concentrate was set at 50° C. and it was stirred vigorously. Sulfitolysis was initiated by adding to protein concentrate 2.4 g sodium metabisulfite, and the pH was adjusted to 6.0 with NaOH. The mixture was stirred further and the reaction was allowed to proceed for 30 min. After this, the proteins modified were partly precipitated by lowering the pH to 5.3 by adding HCl to the mixture. The mixture comprising the precipitate was stirred for another 15 min. The precipitate was removed by centrifugation at 10,000 rpm for 30 min. The amount of precipitated protein was 16% and that of the soluble protein accordingly 84%.

EXAMPLE 3

For modification and fractionation 0.5 liters of whey protein concentrate of the previous example the concentration of which was 10.5% were transferred to a 1.0 liter glass beaker. The temperature of the concentrate was set at 55° C. and it was stirred vigorously. Sulfitolysis was initiated by adding to protein concentrate 2.4 g sodium metabisulfite, and the pH was adjusted to 6.0 with NaOH. The mixture was stirred all the time and the reaction was allowed to proceed for 30 min. After this, the proteins modified were partly precipitated by lowering the pH to 4.8 by adding HCl to the mixture. The mixture comprising the precipitate was stirred for another 15 min. The precipitate was removed by centrifuigation at 10,000 rpm for 30 min. The amount of precipitated protein was 26% and that of the soluble protein accordingly 74%.

EXAMPLE 4

For modification and fractionation 0.45 liters of whey protein concentrate the concentration of which was 9.0% were transferred to a 1.0 liter glass beaker. The whey protein concentrate had been diluted from a 16% concentrate that had been produced industrially by diafiltration and that had, before dilution, been microfiltrated through a 0.45 μm membrane using Millipore Prostak equipment for removal of any casein particles and for diminishing lipoproteins. The temperature of the concentrate was set at 55° C. and it was stirred vigorously.

Sulfitolysis was initiated by adding to protein concentrate 3.25 g sodium metabisulfite, and the pH was adjusted to 6.0 with NaOH. The mixture was stirred all the time and the reaction was allowed to proceed for 30 min. After this, the proteins modified were partly precipitated by lowering the pH to first 5.3 and then to 4.8 by adding HCl to the mixture. The mixture comprising the precipitate was stirred for another 15 min after decreasing the pH before a sample was taken. The precipitates was removed by centriaitgation at 10,000 rpm for 30 min. The amount of precipitated protein at pH 5.3 was 39% and that of the soluble protein 61%. Corresponding figures at pH 4.8 were 46% and 54%.

Gel electrophoresis showed that the soluble portion fractionated at pH 5.3 had still some BSA. bovine serum albumin) along with β-lactoglobulin whereas at pH 4.8 no BSA remained, only β-lactoglobulm.

EXAMPLE 5

For modification and fractionation 0.5 liters whey concentrate the concentration of which was 8.57% were transferred to a 1.0 liter glass beaker. The temperature of the concentrate was set at 60° C. and it was stirred vigorously. Sulfitolysis was initiated by adding to protein concentrate 4.8 g sodium metabisulfite, and the pH was adjusted to 6.0 with NaOH. The mixture was stirred and the reaction allowed to proceed for 30 min. After this, the proteins modified were partly precipitated by lowering the pH to 4.5 by adding HCl to the mixture. The mixture comprising the precipitate was stirred for another 15 min. The precipitate was removed by centrifugation at 10,000 rpm for 30 min. The amount of precipitated protein was 66% and that of the soluble protein accordingly 34%.

EXAMPLE 6

In a 15 liter reactor equipped with stiffing device, temperature and pH adjustment devices as well as gas inlet possibility in the bottom of the reactor were transferred 9.0 liters of whey protein concentrate that had been microfiltered with laboratory equipment and concentrated by ultrafiltration and the concentration of which was 11.1% for modification of whey protein. The temperature of the concentrate was set at 55° C. and it was stirred vigorously.

Sulfitolysis was initiated by adding to the protein concentrate 63 g sodium metabisilfite and the pH was adjusted to 6.0 with NaOH. The mixture was stirred and reaction allowed to proceed for 30 min. After this, the pH of the modified protein concentrate was lowered to pH 2.0 by adding thereto HCl with stirring at which pH major part of the sulfite is as part of the equilibrium reaction as sulfur dioxide and the S-sulfonate groups formed at the number of disulfide bonds indicated by the degree of modification are liberated also as sulfur dioxide. The stirring was continued for 15 min. For removal of sulfur dioxide sterile air at 3 liter/min. was blown into the reactor for about one hour while stirring vigorously the result of which was removal of sulfur dioxide with the air blown into the reactor and water vapor. The air containing sulfur dioxide was conducted to a receiving vessel where at pH 7.0 it was solubilized in water and neutralized to a mixture of sodium sulfite and sodium hydrogensulfite. Thereafter the pH of the modified protein concentrate is raised to 5.0 and any small amount of sulfite that may remain even after blowing out of sulfur dioxide was oxidized into sulfate by blowing sterile air to the reactor as described above while stirring for about 30 min.

After this, the modified protein concentrate was washed by diafiltration through 10,000 D ultrafiltration membranes using 3 volumes of water by which procedure the lactose and salt content was reduced to ⅓. The modified protein concentrate obtained is as to its composition similar to the original one but its functional properties have changed, e.g. its hydrolizability by pepsin (rate of hydrolysis) is 2.2 fold in relation to the original concentrate in 3 hours.

EXAMPLE 7

7.0 liters of the 9.0% whey protein concentrate described in example 4 was transferred to the reactor according to example 6 for modification and fractionation. The temperature of the concentrate was set at 55° C. and it was stirred vigorously.

Sulfitolysis was initiated by adding to the protein concentrate 32 g sodium metabisulfite and the pH was adjusted to 6.0 with NaOH. The mixture was stirred and reaction allowed to proceed for 30 min. After this, the modified proteins in the protein concentrate were partly precipitated by lowering the pH to 4.5 by adding HCl. The mixture with the precipitate was stirred for another 15 min. in order to equilibrate precipitated and soluble protein. The proteins precipitated were separated after precipitation by filtering through 0.45 μm microfiltration membranes and washed with one volume of water. The filtrate was recovered and used as first wash water for the filtrate obtained by microfiltration, i.e. the soluble portion.

The pH of the precipitate was lowered to 2.0 with HCl and the sulfur dioxide liberated was blown out; thereafter pH was raised to 5.0 and mixture blown again in order to oxidize the small amount of sulfite remaining to sulfate as described in example 6. Finally this fraction was washed by ultrafiltration to reduce lactose and salt content and was concentrated to protein concentration of 10%.

From the soluble part sulfite and S-sulfone groups were removed as was described above for the precipitate portion. After this, pH was raised to 4.5 and mixture was washed by ultrafiltration first with wash water from the microfiltration and then twice with water and was concentrated to protein concentration of 15%.

EXAMPLE 8

For modification of soy protein 70 g of isolate were mixed with 1.0 liters of water in a 2 liter glass beaker. The protein content of the soy isolate was about 85%. The temperature of the suspension was set at 70° C. and it was stirred vigorously.

Sulfitolysis was initiated by adding to isolate suspension 9.5 g sodium metabisulfite and the pH was adjusted to 6.5 with NaOH. Reaction time was 30 min., during all of which time the suspension was vigorously stirred.

After modification, the pH of the suspension was lowered to 4.5 which caused the soy proteins to precipitate. The precipitate was centrifuged at 10,000 rpm for 30 min. whereby the protein precipitate remained at the bottom of the tube and salts, e.g. sulfite and some protein (about 0.5%) were left in the clear water layer, i.e. supernatant. With two washes the amount of salts was significantly lowered whereas these washes contained only remnants of protein. After washing the pH was lowered to 2.5 and held at that value for 15 min. while mixing.

pH was raised again to 4.5, where the precipitate was washed once more and the pH of protein solubilized to original concentration was raised to 6.0. This was the end product for which were determined trypsin inhibitor activity plus size distribution of 30 protein molecules by gel electrophoresis. The trypsin inhibitor activity was determined by a method, that is described in Kakade, M. L., Rackis, J. J., McGhee, J. E., and Puski, G., Cereal Chem. 51 (1974) 376–382.

According to the results of these determinations soy protein isolate had lost all of its 35 trypsin inhibitor activity whereas the original isolate protein used for comparison was active in the most concentrated and the second most concentrated sample in the dilution series according to this method; the third most concentrated sample had detectable activity. Gel electrophoresis showed when comparing protein molecule distribution of the original soy isolate to that of the modified isolate distinct increase of proteins of smaller molecular weight, i.e. partial proteins of larger proteins, in the modified isolate.

Above are presented some applications of the invention. Self evidently the invention is not limited to the above examples but the inventive principle can be modified in the scope of appended claims.

What is claimed is:

1. A method for modification and isolation of a protein comprising:
    a) providing a protein selected from the group consisting of whey and soy proteins
    b) providing a reagent that forms sulfite ions;
    c) mixing the protein with the reagent under a condition to sulfonate the protein without using an oxidizing agent in a reaction time of 10 to 50 minutes and to obtain a mixture containing a sulfonated protein;
    d) precipitating the sulfonated protein at an acid pH to form a precipitated sulfonated protein and a soluble sulfonated protein; and
    e) recovering the precipitated sulfonated protein or the soluble sulfonated protein.

2. A method according to claim 1, wherein a degree of sulfonation of the protein is affected by reaction conditions and amount of reagents used.

3. A method according to claim 1, further comprising a step of removing sulfone groups from the sulfonated protein and the sulfite ions that did not react with the protein, the removing step comprising lowering the pH to about 1.5–4, whereby the sulfone groups and the sulfite ions are liberated as sulfur dioxide and free sulfhydryl groups are created in the protein.

4. A method according to claim 3, further comprising a step of blowing air into the mixture at pH 4.5–8.5 and at a temperature of 45–75° C. to form disulfide groups from the free sulfhydryl groups in the protein.

5. A method according to claim 1, wherein the protein is a soy protein and the soy protein is mixed with the reagent at a temperature in a range of 60–80° C.

6. A method of claim 5, wherein the temperature is in the range from 65° C. to 75° C.

7. A method according to claim 1, wherein the protein is a whey protein and the whey protein is mixed with the reagent at a temperature in a range of 40–65° C.

8. A method according to claim 7, wherein the whey protein is in a form of a concentrate and has a concentration of 9–12% by weight.

9. A method of claim 7, wherein the temperature is in the range from 50° C. to 60° C.

10. A method according to claim 1, wherein the sulfonated protein is precipitated as fractions of varying composition by adjusting the pH.

11. A method according to claim 10, wherein the sulfonated protein is precipitated by lowering the pH to 1.5–5.5.

12. A method of claim 11, wherein the pH is in a range from 4.0 to 5.0.

13. A method according to claims 1, 7, or 5, wherein the mixing step (c) is carried out at a pH in a range from 5.5 to 8.

14. A method of claim 13, wherein the pH of the mixing step (c) is in a range from 6 to 7.

15. A method according to claim 13, wherein the reagent comprises sulfite having a concentration from 0.02 M to 0.20 M.

16. A method of claim 15, wherein the concentration of sulfite is from 0.05 M to 0.10 M.

* * * * *